March 31, 1964 D. L. SMITH 3,127,260
SEPARATION OF AIR INTO NITROGEN, OXYGEN AND ARGON
Filed Dec. 21, 1960
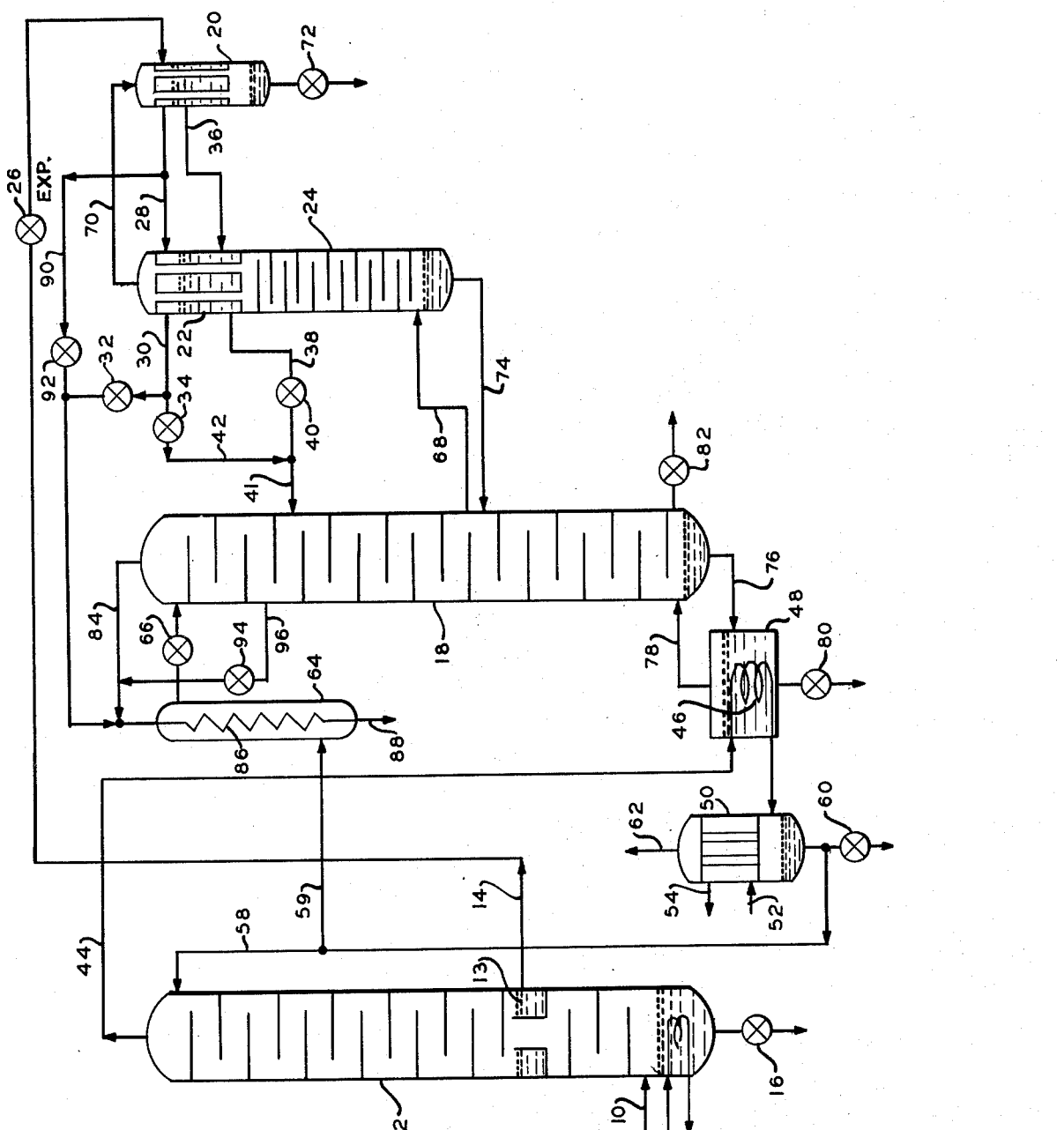
INVENTOR.
DONALD L. SMITH
BY
AGENT

United States Patent Office 3,127,260
Patented Mar. 31, 1964

3,127,260
SEPARATION OF AIR INTO NITROGEN, OXYGEN AND ARGON
Donald L. Smith, Berkeley Heights, N.J., assignor to Air Reduction Company, Incorporated, New York, N.Y., a corporation of New York
Filed Dec. 21, 1960, Ser. No. 77,343
8 Claims. (Cl. 62—22)

This invention relates to the separation of the elements of air by liquefaction into high purity liquid and gaseous products, and more particularly relates to an improved process and apparatus for the simultaneous recovery of liquid nitrogen and argon.

An object of the invention is to obtain a high argon recovery in excess of 80 percent of the available argon in the processed air fraction while at the same time withdrawing substantial amounts of high purity liquid nitrogen as well as high purity liquid oxygen and high purity gaseous oxygen.

Refrigerated, incoming air devoid of condensable impurities is scrubbed by rich liquid in the lower portion of the usual high pressure column where the liquid collecting at the base is boiled as by heat exchange with expanded recycle nitrogen, and a purge fraction containing krypton and xenon may be removed from the bottom of the scrubber along with impurities.

Thereafter the scrubbed air is rectified into high purity nitrogen effluent, and oxygen-enriched liquid air (rich liquid) in the upper portion of the high pressure column. The nitrogen effluent is partially condensed by heat exchange with high purity liquid oxygen in a separate reboiler which is connected to the bottom of a low pressure oxygen column. Condensation of the nitrogen effluent from the nitrogen column is completed in a separate nitrogen condenser which may be refrigerated by heat exchange with expanded recycle nitrogen. This condensation step results in the separation of high purity liquid nitrogen and a gaseous off-take which contains constituents of air which are more volatile than nitrogen, principally neon. Part of the liquid nitrogen so produced is used as reflux for the high pressure column and reflux for the low pressure column, and when desired, a substantial amount of the high purity liquid nitrogen may be withdrawn as a product in accordance with the present invention while maintaining high argon recovery and producing high purity liquid and gaseous oxygen in substantial quantities. The use of the condensed effluent as reflux makes possible the production of high purity nitrogen with the use of a minimum number of vapor-liquid contact plates.

The product from the high pressure column which is processed further for the production of oxygen and argon is the rich liquid which collects in the bottom of the upper portion of the high pressure column.

The rich liquid is expanded, and then rectified in the oxygen column and in the oxygen reboiler connected thereto into waste nitrogen effluent, high purity oxygen, and intermediate vapors containing argon. This rectification is effected by means of the reflux liquid nitrogen and the high purity nitrogen effluent from the nitrogen column which boils the high purity liquid oxygen in the reboiler.

At the proper point in the oxygen column, an argon concentrate containing principally argon and oxygen is passed to an argon column or attachment for separation into crude argon and a residual liquid argon-oxygen mixture. This separation is effected in part by passing the expanded rich liquid from the high pressure column prior to its admission to the oxygen column through an argon condenser in the top of the argon attachment where the rich liquid condenses argon-rich vapor to provide reflux for the argon column. Before entering the condenser of the argon column, the rich liquid is utilized in an argon condenser to liquefy gaseous crude argon from the argon column so that the argon product is in a form which is more suitable for small volume storage.

The process for obtaining high argon recovery broadly involves the introduction of a suitably high purity nitrogen reflux liquid to the top of the low pressure oxygen column, maintaining a low oxygen content and a low argon content in the waste nitrogen effluent from the low pressure oxygen column and adjusting the rate of flow of the high purity nitrogin reflux liquid relivered to the low pressure oxygen column relatively to the total flow of incoming air to an optimum value such as to produce a stratum at an intermediate level in the oxygen column in which the argon concentration in the vapor phase is a maximum.

Usually, there is a limit to the amount of nitrogen reflux liquid that can advantageously be obtained in the liquefaction process. However, increasing the amount of nitrogen reflux beyond the minimum requirement is known to result in an increase in the concentration of the argon at an intermediate level in the oxygen column and a corresponding increase in the percentage of argon recovery.

Removal of liquid nitrogen as a product from the process stream reduces the amount of liquid nitrogen (relatively to the total air feed) which is available for refluxing the oxygen column. Nitrogen product removal in the form of high purity liquid nitrogen also results in a nitrogen reflux liquid of reduced purity if it is attempted to maintain a high reflux rate. Equilibrium of nitrogen, oxygen and argon in the effluent at the top of the oxygen column then occurs at a larger proportion of oxygen and argon relatively to the nitrogen, thereby carrying to waste with the waste nitrogen a considerable amount of argon from the top of the column, which argon is thus not available at the intermediate level where greatest concentration of argon relative to oxygen occurs. The reduction in the amount and purity of the nitrogen reflux thus both result in a lowering of the percentage recovery of argon.

I have found that the removal of liquid nitrogen as a product may advantageously be compensated and the liquid-vapor balance in the oxygen column restored to a value consistent with high argon recovery, by reducing the amount of vapor processed while removing liquid nitrogen, as compared with the amount of vapor processed when no removal of product liquid nitrogen is taking place.

I have found further that the ratio of liquid to vapor may best be optimized in the upper portion of the oxygen column, particularly in the region from the neighborhood of the feed-in point of the rich liquid to the top of the column. The liquid-vapor ratio may be controlled by adjusting the flow of vapor rising in this zone of the column in direct exchange with the reflux liquid. The flow of vapor in this region may be controlled in a variety of ways. One way is to bypass some of the vapor phase by leading off some of the vapor before it reaches the feed-in point and sending the vapor directly to the conduit which contains the effluent gas from the top of the column. The vapor may be led off at one or more points in the feed line to the column. Another way is to bypass some of the vapor which is rising in the oxygen column, by leading this vapor away from the column at a level near the feed-in point of the rich liquid and feed this vapor to the conduit which contains the effluent gas from the top of the column. All these ways have the common effect of bypassing some of the vapor around that portion of the column above the point of introduction of the rich liquid. The amount of vapor so bypassed may be adjusted to compensate for reduction of liquid reflux in this critical region so as to restore the liquid-vapor ratio to an optimum value conducive to maximum argon recovery.

The process and apparatus disclosed herein are adapted to produce simultaneously substantial amounts of high purity liquid nitrogen, high purity liquid oxygen, high purity gaseous oxygen, and liquid argon equal to 80 percent or more of the argon in the processed air fraction, as well as a neon-rich gaseous product and a liquid product rich in krypton and xenon.

Other objects, features and advantages will appear from the following more detailed description of an illustrative embodiment of the invention, which will now be given in conjunction with the accompanying drawing, which is a schematic flow sheet for the said embodiment.

An air stream is prepared for feeding into a high pressure nitrogen column in the usual manner, for example as shown and described in U.S. Patent No. 2,762,208, issued September 11, 1956, to Wolcott Dennis. The air may first be compressed, for example to a pressure of about 100 pounds per square inch absolute, and cooled to about 80° F. by conventional coolers. The compressed air may then be further cooled by passing it through a reversing heat exchanger or reversing regenerators, to approximately the liquefaction temperature of the air (about —280° F.) by heat exchange with countercurrent flowing streams of waste nitrogen or other cold gases from the liquefaction process. As is conventional in the art, means are provided to reverse or alternate the flow of air and cold gas in respective passages of the exchangers or regenerators, in order that removal of carbon dioxide and other impurities which are deposited from the incoming air can be accomplished by the cold gas in addition to the indirect cooling of the air by the cold gases.

After the air has thus been cooled and freed of condensable impurities, it is fed, as shown in the drawing, through an inlet conduit 10 to the lower (scrubbing) portion of a high pressure (nitrogen) column 12 which is equipped with the usual series of trays for effecting rectification. The vapor portion of the air feed at about —277° F., comprising mainly oxygen, argon and nitrogen, rises in intimate contact with a descending stream of colder (about —285° F.) liquid nitrogen reflux in the usual manner, producing effluent nitrogen gas at the top of the column and argon-carrying oxygen-rich liquid which may be taken off through a conduit 14 from a collecting shelf or trough 13 in the lower portion of the column. The liquid portion of the air feed, containing high boiling impurities such as hydrocarbons, collects in the bottom of the column and may be purged by means of a valve 16, and processed for recovery of krypton and xenon.

The oxygen-rich liquid in the conduit 14, which may amount to approximately 56 percent of the air feed, is expanded and partially vaporized in a valve 26 and fed to the low pressure (e.g., 18 p.s.i.a.) oxygen column 18 after first being used to condense argon-rich vapor by heat exchange in an argon condenser 20 and in the head condenser 22 of an argon column 24. The conduit 14 is connected through the valve 26 to the shell of the condenser 20. The vapor phase, which may, for example, amount to a flash of about 14 percent of the oxygen-rich liquid, passes directly through the shell and through a conduit 28 to the shell of the condenser 22 and thence through a conduit 30 to valves 32 and 34, together with the further portions vaporized in the condensers 20 and 22. The liquid phase passes through the shell of condenser 20, thence through a conduit 36 to the shell of condenser 22 and from there through a conduit 38, a valve 40 and an inlet conduit 41 to the upper portion of the low pressure column 18 as liquid feed for the column. By means of the valve 34, in conjunction with valve 32, all or any portion of the vapor phase in conduit 30 may be fed to the low pressure column 18 as vapor feed through a conduit 42 and the conduit 38.

The effluent (nitrogen) gas from the top of the high pressure column 12 passes through a conduit 44 and thence through the reboiler coil 46 of an oxygen reboiler 48 to a nitrogen condenser 50. The nitrogen vapor from the conduit 44 is partially condensed by heat exchange with liquid oxygen in contact with the coil 46 and is further condensed in the nitrogen condenser 50. The shell of the condenser 50 may be cooled by any suitable refrigerant passing in through a conduit 52 and out through a conduit 54. Liquid nitrogen which collects in the sump of the nitrogen condenser 50 may be taken off through conduits 58 and 59 respectively to serve as reflux for the high pressure column 12 and the low pressure column 18, and a portion of the liquid nitrogen may also be withdrawn as product through a valve 60. Low boiling fractions such as neon may be vented, or drawn off for further processing, through a conduit 62 at the top of the nitrogen condenser 50.

The liquid nitrogen from conduit 59 passes through the shell of a subcooler 64 and thence through a valve 66 to the top of the low pressure column 18 as reflux.

The usual process of rectification in the column 18 results in high purity liquid oxygen in the sump, high purity nitrogen gas at the top, and a mixture of oxygen vapor and argon vapor in varying proportions in the intermediate portion of the column. There exists a point in the column where the concentration of argon is a maximum. At this point, the vapor may be 85 to 90 percent oxygen, 15 to 10 percent argon, with perhaps 0.01 percent of nitrogen. At such a point of maximum argon concentration a conduit 68 is connected to lead off the vapor to the lower portion of the argon column 24. The rising argon-rich vapor in the column 24 is condensed in the head condenser 22 by heat exchange with the oxygen-rich liquid in the shell of the condenser 22 and is washed by the descending condensed liquid. The result is a collection of a liquid oxygen-argon mixture in the sump and effluent argon vapor at the top of column 24. The argon vapor passes through a conduit 70 and the tubes of the argon condenser 20 and is condensed by heat exchange with oxygen-rich liquid in the shell of the condenser. The liquid argon product may be withdrawn by means of a valve 72.

The liquid oxygen-argon mixture in the sump of the argon column 24, which is lower in argon content by the amount of argon extracted in the argon column, may be returned through a conduit 74 to the low pressure column 18 at a level below that at which the conduit 68 leaves the column 18, at which lower level the argon content is approximately the same as the argon content in the liquid in the conduit 74. The liquid from the conduit 74 is further rectified in column 18 and the residue is added to the liquid in the sump of column 18. This liquid is withdrawn through a conduit 76 to the shell of the oxygen reboiler 48. The liquid oxygen in the reboiler 48 is reboiled by heat exchange with effluent nitrogen in coil 46. Oxygen vapor from reboiler 48 is returned to the lower portion of column 18 through a conduit 78, while product liquid oxygen may be withdrawn by means of a valve 80.

High purity gaseous oxygen may be withdrawn or vented from a level immediately above the liquid level in column 18 by means of a valve 82.

The effluent from the top of column 18 is passed through a conduit 84 to a coil 86 in the subcooler 64. The effluent is then taken off through a conduit 88 and is used for refrigerating the air feed as in reversing regenerators or exchangers in known manner, as more fully described in the Dennis patent above cited.

When product liquid nitrogen is withdrawn through valve 60, the amount of liquid nitrogen available as reflux for the low pressure column 18 is reduced, with a resulting unbalance between the amount of rising vapor and the amount of reflux in the column 18. This unbalance causes the point of maximum argon concentration to move up the column from the location of conduit 68 and causes a reduction in the maximum obtainable concentration of argon. It is usually not feasible to make up the required amount of reflux by introducing additional liquid because either no additional liquid is available or apparatus for providing such liquid is not available.

I have found that it is advantageous to restore the balance in the low pressure column by reducing the amount of vapor in the region of the column 18 above the oxygen-rich feed to a point where it again balances the available liquid reflux. Generally, it is desired that the rising vapor in this portion of the column not exceed about two times the reflux liquid on a standard cubic foot basis. This may be done in various ways. For example, part or all of the vapor in conduit 42 may be diverted and combined with the effluent in coil 86 and conduit 88. For this purpose, a branch conduit 90 and a valve 92 are provided. The conduit 90 and valve 92 may divert some or all of the vapor from conduit 28 and deliver it to the coil 86. Vapor so diverted does not reach valve 34 and conduit 42. In case additional diversion of vapor is necessary, valve 32 may be opened and valve 34 closed to divert vapor at the top of condenser 22 from conduit 42. If still further reduction of rising vapor is required, a valve 94 may be provided in a conduit 96 connected to an upper portion of column 18 by which some of the rising vapor in the upper portion of column 18 may be diverted to conduit 84. All of these expedients have the effect of by-passing some of the vapor which would otherwise pass upward through the portion of column 18 above the feed-in point of the oxygen-argon mixture from valve 40 and conduit 41. Any or all of these expedients may be used in any combination to reduce the flow of rising vapor in column 18 and thus to restore the desired balance of vapor and liquid reflux consistent with optimum recovery of argon of maximum purity.

It is preferable, in case more than one of the above-mentioned expedients for reducing the vapor load on the column is needed, that they be availed upon in the order named, because the vapor in conduit 90 contains more nitrogen and less argon and oxygen than does the vapor in conduit 30, and the vapor in conduit 30 contains more nitrogen and less argon and oxygen than does the vapor in conduit 96. It will be evident that less argon and less oxygen are vented to waste through conduit 90 than through conduit 30 and valve 32, and less through conduit 30 and valve 32 than through conduit 96. It will be evident that no more of such vapor is discarded than that required to maintain the vapor in the upper portion of the column within the limit of about twice the reflux liquid rate as described above.

During the operation of the rectification process as above described, gaseous oxygen may be continuously withdrawn as through valve 82 at the bottom of column 18. Such withdrawal of gas, while it reduces the vapor load in the column, does not serve to restore proper liquid-vapor relationships in critical portions of the column. One reason is that the yield and purity of the argon product are adversely affected by increased withdrawal of gaseous oxygen from the bottom of the column. This is evident from the teachings of the Dennis patent, previously referred to, in which it is pointed out that an optimum concentration of argon at the point of withdrawal, as by the conduit 68, is sensitive to the liquid-vapor reflux ratio at the point of withdrawal, and that this ratio, in turn, is dependent upon the amount of oxygen withdrawal, as through the valve 82. Another reason is that as additional amounts of gas are withdrawn at the bottom of the column in excess of the amount of oxygen in the feed, the purity of the gas withdrawn is reduced, causing a descent of the undesired constituents and the inclusion thereof in the liquid and gaseous oxygen products. In other words, some of the argon and nitrogen is withdrawn with the oxygen, thereby contaminating the oxygen products in addition to reducing the yield and purity of the argon product.

It will be evident that venting of vapor to reduce the vapor load on the column is preferably done in the portion of the column above the inlet of the feed conduit 41, since any vapor vented below this point carries to waste excessive amounts of argon and oxygen and also adversely affects the argon and oxygen products. Venting of vapor from the portion of the column above the inlet of the feed conduit 41 has a substantially negligible effect upon the argon and oxygen products.

Operation as described herein effectively retains within the low pressure column the argon which would otherwise not be completely washed out by the liquid reflux when the amount of liquid reflux is reduced, and so would be lost with the nitrogen effluent. This is done without materially affecting the purity of the oxygen product. The equilibrium of nitrogen, oxygen and argon in the effluent at the top of the oxygen column is returned to a point where the proportion of oxygen and argon relative to nitrogen in the effluent is reduced to a minimum, thereby reducing the amount of argon and oxygen carried to waste with the waste nitrogen and restoring an optimum amount of argon available at the intermediate level where greatest concentration of argon relative to oxygen occurs. Thus, the condition for optimum recovery of argon may be restored, simultaneously with the removal of products of nitrogen and oxygen.

The invention may be advantageously applied in an organization such as is described and claimed in my copending application Serial No. 703,196, filed December 16, 1957, now Patent No. 2,982,107, and assigned to the assignee of the present application, wherein a required high purity reflux nitrogen liquid is employed in the low pressure or oxygen rectification column, and a required high purity nitrogen effluent is preferably maintained having an oxygen content below about 0.015 mol percent and an argon content below about 0.15 mol percent. To maintain these values of purity in such a system, it has been found necessary to maintain a rate of flow of the reflux liquid of at least about 64 mol percent of the feed rate of the oxygen-rich air, in which case a stratum is produced at an intermediate level in the oxygen column wherein the argon concentration is in excess of about 10 mol percent. In accordance with the particularly advantageous objectives of the present invention, a system such as that described in my above-mentioned copending application may be utilized to supply a substantial quantity of liquid nitrogen product, even to such an extent that the desired quantity of the requisite high purity reflux liquid nitrogen cannot be maintained by conventional means. In such case, the desired operating conditions of the oxygen column, as specified in said copending application, may be maintained by regulating the vapor rising in the upper portion of the oxygen column so that the vapor flow does not exceed about twice the amount of nitrogen reflux liquid supplied thereto. In such operation, of course, the available supply of high purity reflux nitrogen may be materially reduced, but its purity is desirably maintained at the desired level effective to operate the column with the relatively low content of argon and oxygen in the nitrogen effluent as described in my copending application, by means of the expedient in accordance with the present invention. A small amount of argon will of necessity be wasted in the vented vapor from the oxygen-rich liquid, but this amount will be small relatively to the amount of argon which goes out with the effluent nitrogen when insufficient reflux liquid is supplied to process the amount of rising vapor present in the oxygen column, or when the required amount of liquid reflux is maintained but is of a correspondingly reduced purity.

Values given herein for temperatures, pressures, volumes, percentages, etc., are illustrative and not limiting and may be varied considerably in practice. Where volumes of vapor or of vapor and liquid are compared, it will be understood that the comparisons are to be made on a basis of vapor or equivalent vaporized liquid measured in standard cubic feet of vapor. In particular, the balance of liquid reflux to rising vapor in the oxygen column is to be interpreted in terms of reduction to rate of flow of vapor in standard cubic feet per unit time.

While an illustrative form of apparatus and methods in accordance with the invention have been described and shown herein, it will be understood that numerous changes may be made without departing from the general principles and scope of the invention.

I claim:

1. An air rectification process highly effective for the production of relatively high proportions of liquid nitrogen and high argon recovery, comprising the steps of separating an air feed stream in a first stage rectification column into a nitrogen-rich fraction, available as a relatively pure nitrogen liquid product and as liquid reflux for a second stage rectification column, and an oxygen-argon-rich liquid fraction, withdrawing said oxygen-argon-rich liquid fraction from said first column, at least partially vaporizing said withdrawn oxygen-argon-rich liquid fraction, delivering at least a portion of said partially vaporized oxygen-argon-rich fraction as feed to said second stage rectification at an intermediate point below the top of said second stage rectification column, withdrawing a portion of said nitrogen-rich fraction as liquid nitrogen product, and excluding a portion of the vapor phase of said partially vaporized oxygen-argon-rich feed from any contact in any of its phases with said liquid reflux in a zone of said second step rectification column above said delivery point of the said oxygen-argon-rich feed and below the input of a nitrogen-rich liquid fraction, thereby maintaining a desired balance of liquid reflux to rising vapor in said zone of the second stage rectification column, whereby a desired high recovery of argon is effected together with substantial production and withdrawal of liquid nitrogen, and removing an argon enriched fraction from said second stage rectification column for further purification.

2. Improvement in a process of producing liquid nitrogen and an argon concentrate simultaneously by separation of constituents of air involving rectification in a low pressure column of an argon-carrying oxygen-rich fraction including a vapor content, nito high purity liquid oxygen and a vapor fraction containing 80 percent or more of the available argon fed to the said column, said rectification being effected by liquid-vapor contact between the vapor content of said argon-carrying oxygen-rich fraction and liquid nitrogen reflux in said column, which improvement comprises the steps of withdrawing from the supply of liquid nitrogen a portion thereof as product liquid nitrogen, thereby reducing the amount of liquid nitrogen available as reflux for said low pressure column, and withdrawing from the vapor content of the supply of argon-carrying oxygen-rich feed for introduction into the upper portion of the low pressure column a corresponding amount thereof, thereby restoring the balance of liquid reflux to rising vapor to substantially the condition prevailing before the withdrawal of the product liquid nitrogen, and removing an argon enriched fraction from said column for further purification.

3. In apparatus for the separation of the constituents of air, in combination, an oxygen column, means to produce liquid nitrogen reflux for said column, means to supply oxygen-rich argon-carrying vapor and liquid as feed to said column, means to withdraw a portion of the liquid nitrogen from the supply available for reflux for said column, and means to vent a portion of the said oxygen-rich argon-carrying vapor from the supply available as feed for said column, to compensate for the withdrawal of said liquid nitrogen product, whereby the potential percentage recovery of argon from the process stream remains substantially unaffected by the withdrawal of the product liquid nitrogen, and means for removing an argon enriched fraction from said oxygen column for further rectification.

4. In apparatus for the separation of the constituents of air, in combination, a low pressure oxygen column, means to produce liquid nitrogen reflux for said column, means to supply an argon-carrying oxygen-rich fraction as feed to said column, an argon column, means to remove an argon concentrate in vapor phase from an intermediate portion of said oxygen column and introduce said concentrate into said argon column, an argon condenser connected to the argon output of said argon column, means to pass said argon-carrying oxygen-rich fraction through said argon condenser as a refrigerant therein before being fed into said oxygen column, means to withdraw a portion of the liquid nitrogen from said nitrogen producing means as product liquid nitrogen, and means to withdraw and vent a portion of the vapor content of said argon-carrying oxygen-rich fraction between said argon condenser and the point of introduction of said argon-carrying oxygen-rich fraction into said oxygen column.

5. In apparatus for the separation of the constituents of air, in combination, a low pressure oxygen column, means to produce liquid nitrogen reflux for said column, means to supply oxygen-rich argon-carrying vapor and liquid as feed to said column, an argon rectification column connected to an intermediate portion of said oxygen column, a head condenser for said argon column, means to pass said argon carrying vapor and liquid through said head condenser as a refrigerant therein before being fed into said oxygen column, means to withdraw a portion of the liquid nitrogen from said nitrogen producing means as product liquid nitrogen, and means to withdraw and vent a portion of the oxygen-rich argon-carrying vapor between said head condenser and the point of introduction of said oxygen-rich argon-carrying vapor and liquid into said oxygen column.

6. The process of obtaining liquid nitrogen and a high recovery of liquid argon in excess of about 80 percent of the available argon in the processed air fraction, employing a low pressure oxygen column, which process comprises the steps of rectifying air at elevated pressure into a high purity nitrogen effluent and an oxygen-rich argon-carrying liquid, condensing said effluent nitrogen, supplying a portion of the liquid nitrogen resulting from said condensing step to reflux the process stream in said rectifying step, withdrawing another portion of said liquid nitrogen as product, supplying the remaining liquid nitrogen to said oxygen column as reflux therein, at least partially vaporizing said oxygen-rich argon-carrying liquid and feeding the same to an upper portion of said oxygen column, rectifying said oxygen-rich argon-carrying material in said oxygen column to produce waste nitrogen effluent, high purity oxygen and intermediate vapors containing argon, removing at least a portion of said intermediate vapors from said oxygen column separating said removed vapors into crude argon and a residual liquid argon-oxygen mixture by heat exchange with said oxygen-rich argon-carrying material en route to said oxygen column, condensing said crude argon by additional heat exchange with said oxygen-rich argon-carrying material, said last two steps effecting at least partial vaporization of said oxygen-rich argon-carrying liquid, venting a portion of the resulting vapor and thereafter feeding the remainder of said oxygen-rich argon-carrying material to said oxygen column, to compensate at least in part for the said withdrawal of liquid nitrogen product.

7. The process according to claim 6, together with the added step of venting vapor from said oxygen column in a region thereof between the feed point of said partially vaporized oxygen-rich argon-carrying material and the feed point of said liquid nitrogen reflux.

8. An air rectification process highly effective for the production of relatively high proportions of liquid nitrogen and high argon recovery, comprising the steps of separating an air feed stream in a first stage rectification at a first relatively high pressure into a nitrogen-rich fraction and an oxygen-argon-rich fraction, delivering a liquefied portion of the nitrogen-rich fraction from said first stage to a second stage rectification column at a second relatively lower pressure, expanding and partially vaporizing said oxygen-argon-rich fraction and delivering the expanded fraction to said second stage rectification column at an intermediate point below the top of said second stage rectification column, and excluding a portion of the vapor phase of said expanded oxygen-argon-rich fraction from any contact in any of its phases with said liquid reflux in a zone of said second stage rectification column above said delivery point of the said expanded fraction and below the input of the nitrogen-rich liquid fraction, thereby maintaining a desired balance of liquid reflux to rising vapor in said zone of the second stage rectification column, whereby a desired high recovery of argon is effected together with substantial production and withdrawal of liquid nitrogen, and removing an argon enriched fraction from said second stage rectification column for further purification.

References Cited in the file of this patent
UNITED STATES PATENTS

| | | |
|---|---|---|
| 1,557,907 | Van Nuys | Oct. 20, 1925 |
| 2,497,589 | Dennis | Feb. 14, 1950 |
| 2,762,208 | Dennis | Sept. 11, 1956 |
| 2,824,428 | Yendall | Feb. 25, 1958 |
| 2,909,410 | Fedorko | Oct. 20, 1959 |
| 2,934,908 | Latimer | May 3, 1960 |
| 2,982,107 | Smith | May 2, 1961 |
| 3,037,359 | Knapp | June 5, 1962 |